United States Patent
Lee et al.

(10) Patent No.: US 6,952,308 B2
(45) Date of Patent: Oct. 4, 2005

(54) MULTI-STAGE BIDIRECTIONAL OPTICAL AMPLIFIER

(75) Inventors: Chang Hee Lee, Taejon (KR); Hyun Deok Kim, Taegu (KR); Tae Won Oh, Taegu (KR); Shin Jeong Hun, Taegu (KR); Cho Yun Hee, Seoul (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 0 days.

(21) Appl. No.: 09/912,548

(22) Filed: Jul. 26, 2001

(65) Prior Publication Data

US 2002/0027472 A1 Mar. 7, 2002

(30) Foreign Application Priority Data

Aug. 14, 2000 (KR) ........................................ 2000 47000

(51) Int. Cl.[7] .................................................. H01S 3/00
(52) U.S. Cl. ................................................... 359/341.2
(58) Field of Search ....................................... 359/341.2

(56) References Cited

U.S. PATENT DOCUMENTS

| | | | | |
|---|---|---|---|---|
| 5,604,627 A | * | 2/1997 | Kohn | 359/124 |
| 5,652,675 A | * | 7/1997 | Shibuya | 359/176 |
| 5,801,878 A | * | 9/1998 | Bourret et al. | 359/141 |
| 5,815,308 A | * | 9/1998 | Kim et al. | 359/174 |
| 5,995,259 A | * | 11/1999 | Meli et al. | 359/113 |
| 6,188,509 B1 | * | 2/2001 | Lee et al. | 359/124 |
| 6,310,718 B1 | * | 10/2001 | Saeki | 356/73.1 |
| 6,323,994 B1 | * | 11/2001 | Li et al. | 359/124 |
| 6,392,790 B1 | * | 5/2002 | Lauder et al. | 359/337 |
| 6,529,656 B2 | * | 3/2003 | Lee et al. | 385/24 |
| 2001/0019449 A1 | * | 9/2001 | Krummrich | 359/341.2 |
| 2001/0050804 A1 | * | 12/2001 | Chung et al. | 359/341.2 |

FOREIGN PATENT DOCUMENTS

EP          0739103 A2 * 10/1996       ........... H04B/10/16

* cited by examiner

Primary Examiner—Thomas G. Black
Assistant Examiner—Deandra M. Hughes
(74) Attorney, Agent, or Firm—Bacon & Thomas, PLLC

(57) ABSTRACT

A multi-stage bidirectional optical amplifier amplifies counter-propagating signals at the same time, and includes two single-stage bidirectional optical amplifiers, two multiple reflection suppression means, and a mid-stage component.

11 Claims, 5 Drawing Sheets

MULTI-STAGE BIDIRECTIONAL OPTICAL AMPLIFIER

BACKGROUND OF THE INVENTION

1. Field of the Invention

The present invention relates to a bidirectional optical amplifier that amplifies the counter-propagating signals simultaneously, and more particularly to a multi-stage bidirectional optical amplifier with shared mid-stage components and a means for suppressing the relative intensity noise caused by the multiple back reflections.

2. Description of the Related Art

The bidirectional signal transmission over a single fiber offers several advantages compared with a conventional the unidirectional signal transmission. It reduces the use of fiber infrastructure by a factor of two and enables to achieve a higher spectral efficiency since there are little nonlinear interactions between the counter-propagating signals in optical fibers.

However, the bidirectional transmission systems are susceptible to the optical back reflections. Especially, the relative intensity noise (RIN) induced by the multiple back reflections can degrade the system performance. The magnitude of the Relative intensity noise is proportional to the square of optical amplifier gain. Thus the Relative intensity noise limits the maximum available amplifier gains of the bidirectional transmission systems.

To overcome this problem, many efforts have been devoted to develop optical amplifiers with a means for suppressing relative intensity noise. Referring to appended drawings (FIG. 1~FIG. 3), the prior optical amplifiers for bidirectional optical transmission systems are described hereinafter.

FIG. 1, FIG. 2 and FIG. 3 are the schematic diagrams of the prior bidirectional optical amplifiers with a means for suppressing relative intensity noise induced by the multiple back reflections.

A bidirectional optical amplifier described in FIG. 1 (U.S. Pat. No. 5,815,308) suppresses relative intensity noise by using the frequency tunable reflection attenuator (10) which is laid between two bidirectional optical amplifiers. The frequency tunable reflection attenuator (10) is implemented by using two band-pass filters (38a, 38b) with different pass bands, two optical isolators (18a, 18b) and two directional couplers (DC). Here, the two band-pass filters (38a, 38b) and the two optical isolators (18a, 18b) block the reflected light and thereby suppress the relative intensity noise.

In the figure, the numeric 12 represents a wavelength division multiplexer that couples the signal light and the pump light, 14 represents a pump light source, and 16 represents an Erbium-doped optical fiber.

A bidirectional optical amplifier described in FIG. 2 (C. H. Kim and Y. C. Chung, "2.5 Gb/sx 16-Channel bidirectional WDM transmission system using bidirectional Erbium-doped fiber amplifier based on spectrally interleaved synchronized Etalon filters," IEEE Photon. Technol. Lett., vol. 11. no. 6, pp 745–747, June 1999) is implemented by combining two two-stage unidirectional optical amplifier by using two optical circulators (20a, 20b). Each of the unidirectional amplifiers includes a comb filter, synchronized Etalon filter (22a, 22b), at the mid-stage of it. The pass band and the stop band of a synchronized Etalon filters (22a) coincide with the stop band and the pass band of the other synchronized Etalon filters (22b). Here, the synchronized Etalon filters (22a, 22b) and the optical circulators (20a, 20b) suppress the relative intensity noise.

A bidirectional optical amplifier described in FIG. 3 (U.S. Pat. No. 6,018,404) is composed of four wavelength selective couplers (24a, 24b, 24c, 24d) and a unidirectional optical amplifier (26a). The signals entering into the amplifier are routed by the first and the second wavelength selective couplers (24a, 24b) to direct to the third the wavelength selective coupler (24c). The signals coupled by the wavelength selective coupler (24c) to propagate in same direction, and then amplified by an unidirectional optical amplifier (26a).

The output of the unidirectional optical amplifier (26a) is separated by the fourth wavelength selective coupler (24d) to direct to the first and the second wavelength selective couplers (24a, 24b) and then launched into transmission fibers connected at the both ends of the bidirectional amplifier.

Here, relative intensity noise is suppressed by the optical isolators installed in the unidirectional optical amplifier (26a) and the wavelength selective couplers (24a, 24b, 24c, 24d). To increase the signal bit rate, the number of multiplexed channels, or the transmission distance of the wavelength-division multiplexed bidirectional transmission systems, several supplementary means are required such as means for compensating chromatic dispersion of optical fiber, means for widening the gain-bandwidth of the optical amplifier, means for minimizing the accumulation of optical amplifier noise and so on.

In general, a dispersion compensating fiber is—usually used for compensating the chromatic dispersion, a gain flattening filter for widening the gain-bandwidth of optical amplifier, and an ASE rejection filter for preventing the accumulation of optical amplifier noise.

The components mentioned above are usually incorporated in the mid-stage of a multi-stage optical amplifier to minimize optical signal-to-noise ratio degradation. However, the bidirectional optical amplifiers described in FIG. 1~FIG. 3 are not suitable to incorporate with these elements cost-effectively. For example, let's consider the case we employ a dispersion compensating fiber of which Rayleigh back scattering coefficient is much larger than that of a conventional single mode fiber.

In the amplifier described in FIG. 1, the dispersion compensating fiber must be used inside of the frequency tunable reflection attenuator (10) to prevent the reflected light by the dispersion compensating fiber. Thus we must use two dispersion compensating fibers to implement a bidirectional amplifier. The amplifier described in FIG. 2 employs two separate two-stage unidirectional optical amplifiers (26a), so that it also requires two separate mid-stage components including the dispersion compensating fibers.

In optical amplifier described in FIG. 3, the counter-propagating signals can share a dispersion compensating fiber if we use it at the mid-stage of the unidirectional optical amplifier (26a). In this case, however, the counter-propagating signals pass the dispersion compensating fiber in the same direction, which increases the nonlinear effects in the dispersion compensating fiber makes the nonlinear signals impairment more severe. Furthermore, each way signal passes through two wavelength selective couplers before and after amplification. The insertion loss of the wavelength selective couplers degrade the noise figure of the amplifier and decrease the maximum output power of the amplifier.

SUMMARY OF THE INVENTION

The present invention discloses a multi-stage bidirectional optical amplifier that amplifies counter-propagating signals simultaneously. The multi-stage bidirectional optical amplifier comprises two single-stage bidirectional optical amplifiers, two multiple reflection suppression means and mid-stage components. In operation, one way signal is amplified at a single-stage bidirectional optical amplifier, then passes through a chain of a multiple reflection suppression means, mid-stage elements and the other multiple reflection suppression means, and amplified at the other single-stage bidirectional amplifier. The other way signal propagate in reverse order.

In accordance with present invention, the counter-propagating signals can share mid-stage component. Thus the multi-stage bidirectional optical amplifier is more cost-effective than optical amplifiers with separate mid-stage elements for each way signal. Additionally, the counter-propagating signals traverse the shared mid-stage elements in opposite direction to minimize the signal degradation caused by the nonlinearity of the shared mid-stage element.

DESCRIPTION OF THE NUMERICS ON THE MAIN PARTS OF THE DRAWINGS

Figure 1:
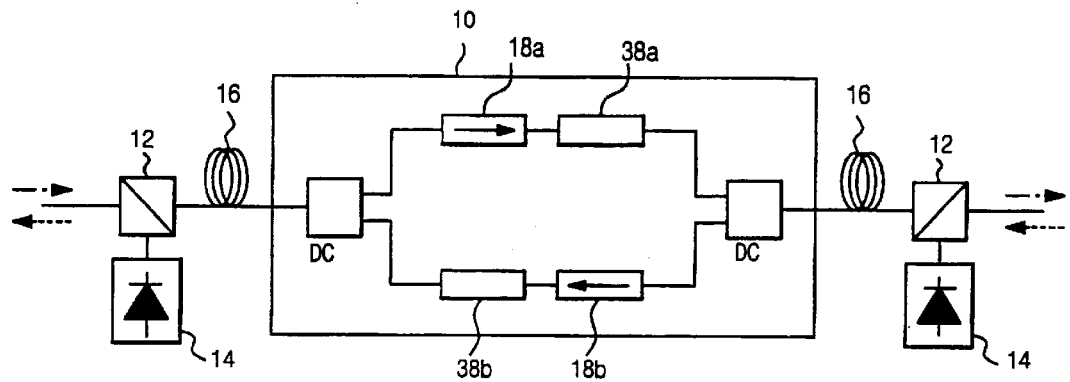
FIG. 1,~FIG. 3 illustrates the structural of the prior bidirectional optical amplifiers.

A: a multi-stage bidirectional optical amplifier
10: a frequency tunable reflection attenuator
12: a wavelength division multiplexer
14: a pump source
16: an erbium-doped optical fiber
18a, 18b: an optical isolator
20a, 20b: an optical circulator
22a, 22b: a synchronized Etalon filter
24a, 24b, 24c, 24d: a wavelength selective coupler
26a: an unidirectional optical amplifier
28a, 28b: a multiple reflection suppression means
30a, 30b: a single-stage bidirectional optical amplifier
p1, p2, p3, p4: a port
34a, 34b: a 4-port wavelength selective router
36a, 36b: an add/drop module
38a, 38b: a band-pass filter
42: a mid-stage element
46a, 46b: a wavelength selective filter

DETAILED DESCRIPTION OF THE EMBODIMENTS

Hereinafter, referring to appended drawings (FIG. 4~FIG. 12), the structure and the operation of the embodiments of the present invention are described in detail.

Figure 4:
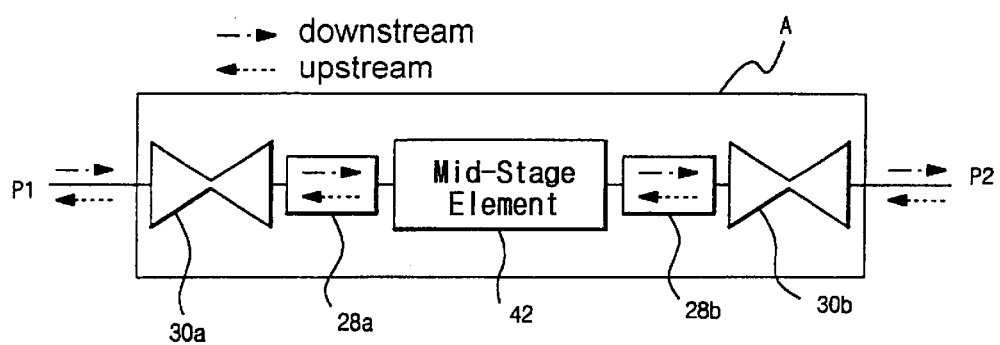
FIG. 4 is a structural diagram illustrating an embodiment of a multi-stage bidirectional optical amplifier in accordance with the present invention.
Figure 5:
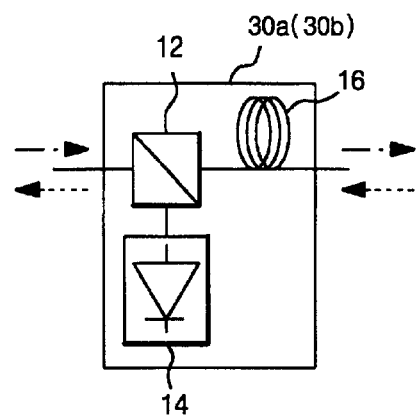
FIG. 5~FIG. 7 are views illustrating the detailed structures of embodiments of single-stage bidirectional optical amplifiers installed in a multi-stage bidirectional optical amplifier in accordance with the present invention.
Figure 6:
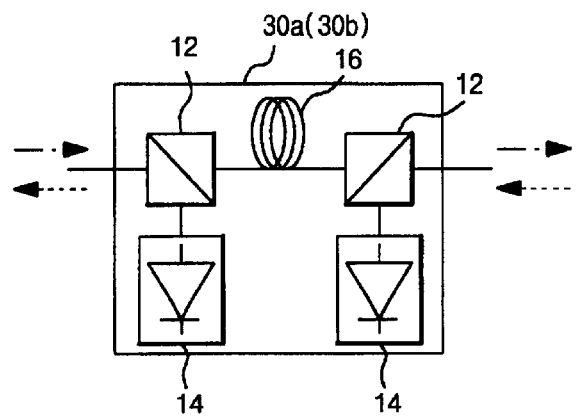
Figure 7:
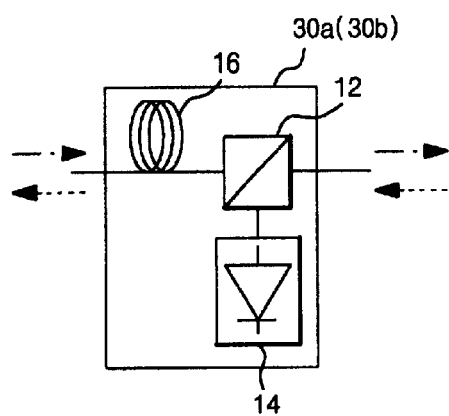
Figure 8:
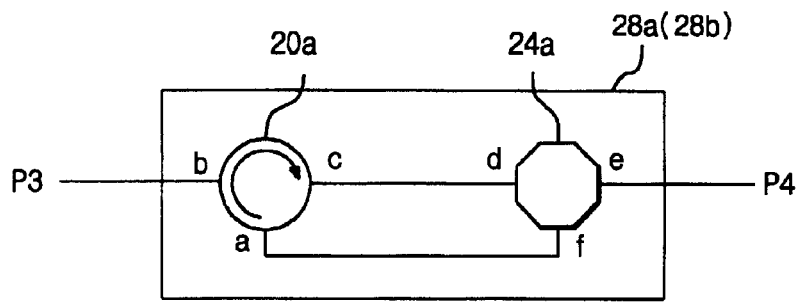
FIG. 8~FIG. 10 are views illustrating the detailed structures of embodiments of multiple reflection suppression means in accordance with the present invention.
Figure 9:
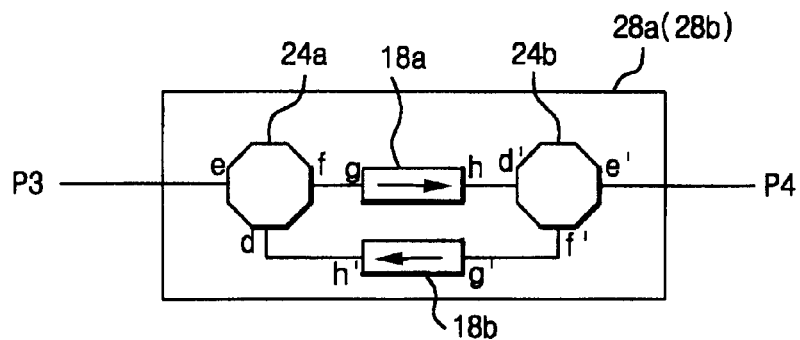
Figure 10:
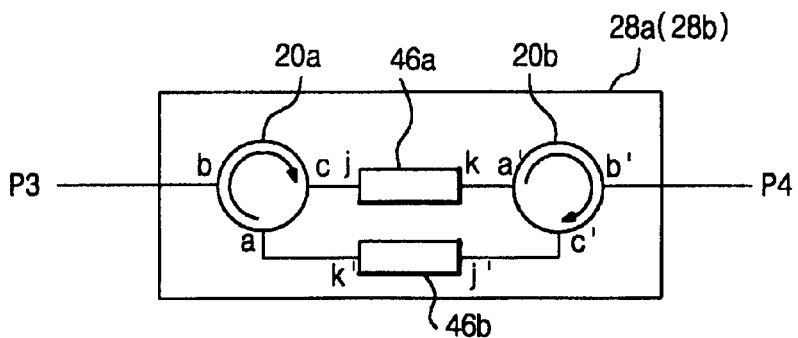
Figure 11:
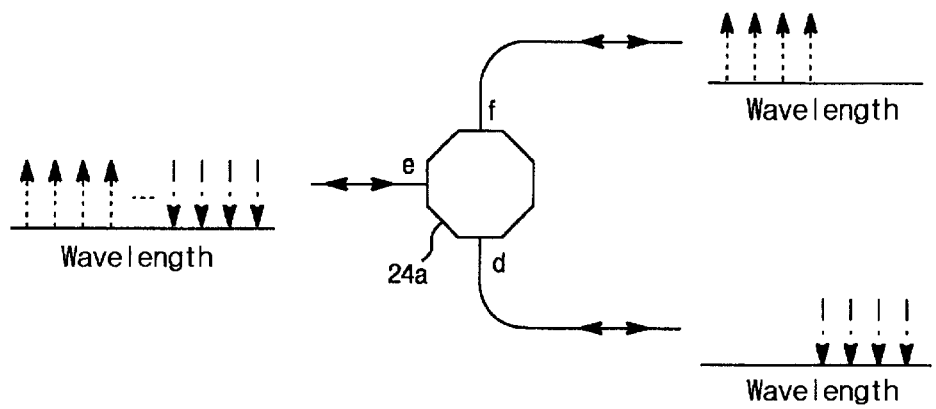
FIG. 11 and FIG. 12 are views illustrating the detailed structures of embodiments of wavelength selective couplers in accordance with the present invention.
Figure 12:
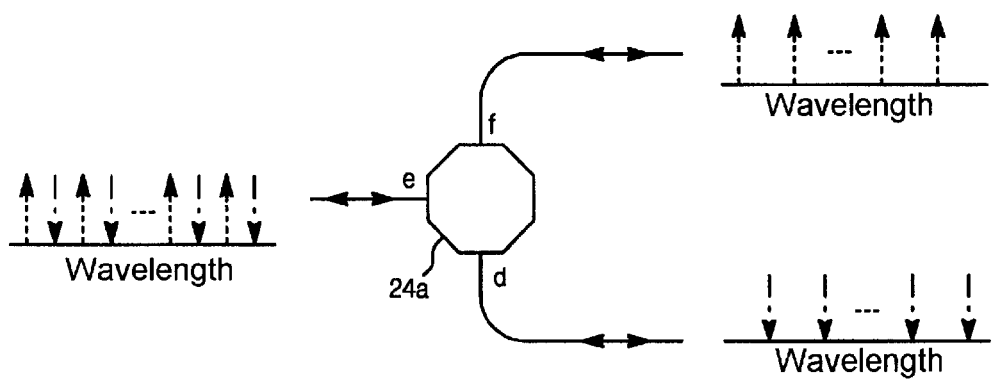

FIG. 4 illustrates a schematic diagram of an embodiment of the multi-stage bidirectional optical amplifier in accordance with the present invention, FIG. 5~FIG. 7 illustrates the detailed structures of embodiments of single-stage bidirectional optical amplifiers installed in the multi-stage bidirectional optical amplifier in accordance with the present invention, FIG. 8~FIG. 10 are schematic views of the embodiments of the multiple reflection suppression means in accordance with the present invention, and FIG. 11 and FIG. 12 are schematic views of embodiments of the wavelength selective couplers in accordance with the present invention.

First, looking into the basic structure of a the multi-stage bidirectional optical amplifier in accordance with the present invention, it comprises has two input/output ports (p1, p2) and comprises for amplifying upstream/downstream optical signals proceeding bidirectionally; two single-stage bidirectional optical amplifiers (30a, 30b), connected to the input/output ports (p1, p2) respectively, for amplifying the optical signals proceeding bidirectionally counter-propagating signals at the same time; two multiple reflection suppressing means multiple reflection suppression means (28a, 28b), each of which each is connected to the input/output port of each single-stage bidirectional optical amplifier (30a or 30b) and transmits provides different transmission characteristics depending on the signal propagation direction; an optical signal having a specific wavelength only to one direction; and a mid-stage component (42), installed connected between the two multiple reflection suppressing means (28a, 28b), comprising a means for compensating the chromatic dispersion of optical fiber, a means for widening the gain-bandwidth of the optical amplifier, a means for minimizing the accumulation of optical amplifier noise, a means for add/drop multiplexing, or a combination of these means. The respective means may include, as described above, the usually used dispersion compensating fiber for compensating chromatic dispersion, gain flattening filter for widening the gain-bandwidth of the optical amplifer, and ASE rejection Filter for preventing accumulation of optical amplifier noise.

Referring to FIG. 4, the structure and the operation of the multi-stage bidirectional optical amplifier (A) in accordance with the present invention are now described in detail.

Through the first input/output port (p1) of the multi-stage bidirectional optical amplifier (A), downstream signals propagating left-to-right input and upstream signals propagating right-to-left output. And through the second input/output port (p2), upstream signals input and downstream signals output.

Downstream signals are amplified by a single-stage bidirectional optical amplifier (30a), and passes through a multiple reflection suppression means (28a), a mid-stage element (42) and the other multiple reflection suppression means (28b), and thereafter re-amplified by the other single-stage bidirectional optical amplifier (30b).

Upstream signals propagate in reverse order in the multi-stage bidirectional optical amplifier. In other words, the downstream and upstream signals share the mid-stage element (42). Here, since the downstream and upstream signals pass through the shared mid-stage element (42) in opposite direction the nonlinear interactions between them can be minimized.

The multiple reflection suppression means (28a, 28b) installed at both ends of the mid-stage component provide different transmission characteristics depending the propagating direction. Namely, it allows the specific wavelength signals pass though the multiple reflection suppression means (28a, 28b) in one directional and blocks them not to pass though the multiple reflection suppression means (28a, 28b) in the other direction. Thus the multiple reflection suppression means (28a, 28b) can attenuate the reflected light not only by the transmission fiber to be connected to the input/output ports (p1, p2) of amplifier (A) but also by the mid-stage element. Thus the multi-stage bidirectional optical amplifier includes a means for suppressing the relative intensity noise.

For example, in case of a dispersion compensating fiber being used as a mid-stage element (42), the dispersion compensating fiber can generate large reflected light caused by the Rayleigh back scattering process and cause nonlinear signal impairments since the core area of the dispersion compensating fiber is much smaller than convention standard single mode fiber. However, in the optical amplifier in accordance with the present invention, two multiple reflection suppression means (28a, 28b) attenuates the reflected lights. In addition, the nonlinear signal impairments are also mitigated because the counter propagating signals pass through the dispersion compensating fiber in opposite direction.

The single-stage bidirectional optical amplifiers (30a, 30b) used in the present invention are a set of rare-earth material (Erbium, Praseodymium, Thulium, etc.)-doped optical fiber amplifiers, semiconductor optical amplifiers, or fiber Raman optical amplifiers.

As described above, in an optical amplifier in accordance with the present invention, the optical signals are amplified at the single-stage bidirectional amplifier and then pass loss passive component, multiple reflection suppression means (28a, 28b) and mid-stage element (42), which minimize the optical signal-to-noise ratio degradation.

FIG. 5~FIG. 7 are illustrates the embodiments of the single-stage bidirectional optical amplifiers (30a, 30b) that employ erbium-doped optical fiber amplifiers described in FIG. 4. They comprise an erbium-doped fiber (16), a pump light source (14), and a wavelength division multiplexer (12) that couples the optical signals and pump light.

Figure 2:
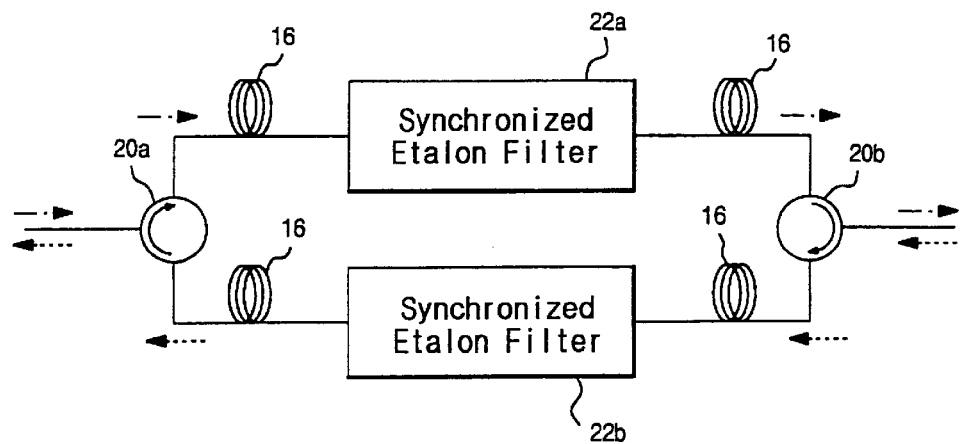
Figure 3:
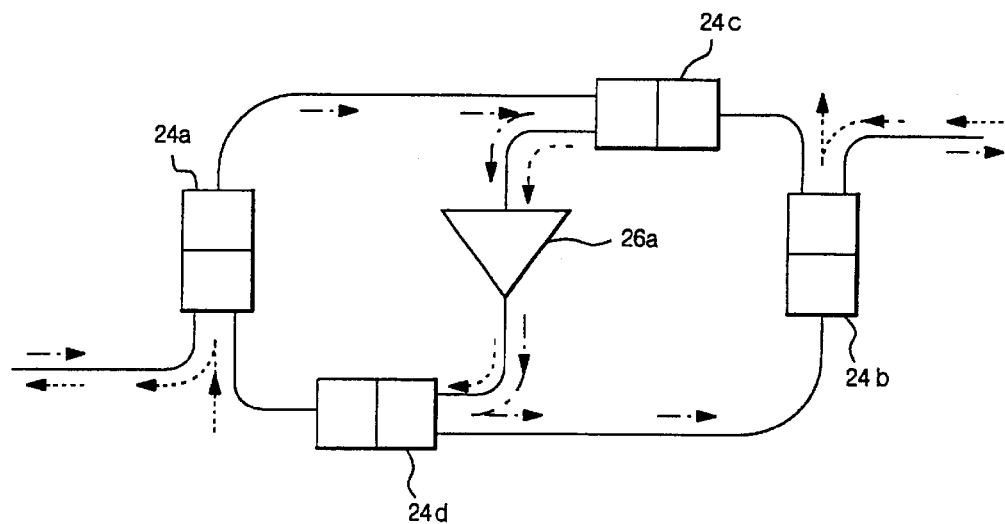

With the structure described above, the single-stage bidirectional optical amplifiers (30a, 30b) do not include non-reciprocal component, optical isolator etc., to amplify the counter-propagating signals simultaneously. FIG. 8~FIG. 10 illustrates the embodiments of multiple reflection suppression means (28a, 28b) described in FIG. 2. Referring to FIG. 8, it has two input/output ports (p3, p4) and comprises an optical circulator (20a) with an input port (a), an output port (c), and a common port (b); and a wavelength selective coupler (24a) with an input port (d), an output port (f), and an common port (e).

Looking into the connection mechanism, the common port (b) of the optical circulator (20a) is connected to the input/output port (p3), the output port (c) of the optical circulator (20a) is connected to the input port (d) of the wavelength selective coupler (24a), the input port (a) of the optical circulator (20a) is connected to the output port (f) of the wavelength selective coupler (24a), and the common port (e) of the wavelength selective coupler (24a) is connected to the input/output port (p4).

The optical circulator (20a) transmits signal consecutively, i.e., from the input port (a) to the common port (b) and from the common port (b) to the output port (c). And the wavelength selective coupler (24a) bidirectionally transmits signals of specific wavelengths between the input port (d) and the common port (e) and the signals of different wavelengths between the common port (e) and the output port (f).

The signal entering through the first input/output port (p3) passes through the connection of the optical circulator (20a) output port (c) and the wavelength selective coupler (24a) input port (d). The signal entering through the second input/output port (p4) pass through the connection of the wavelength selective coupler (24a) output port (f) and the optical circulator (20a) input port (a).

The transmission characteristics of the wavelength selective coupler (24a) determines the signal wavelengths that can be accommodated by the multi-stage bidirectional optical amplifier in accordance with the present invention.

The counter-propagating signals can be allocated in different wavelength bands or interleaved each other in wavelength domain. We refer the former as band-split scheme and the latter wavelength-interleaving scheme.

FIG. 11 illustrates the transmission characteristics of the wavelength selective coupler (24a) for band-split scheme Here, the pass band between port (d) and port (e) is separated by a wavelength band from that between the port (f) and the port (e). A wavelength division multiplexer is a representative sample of this case.

FIG. 11 illustrates the transmission characteristics of the wavelength selective coupler (24a) for wavelength-interleaving scheme. Here, the pass band between port (d) and port (e) and that between port (f) and port (e) are interleaved in wavelength domain. A wavelength interleaver is a representative sample of this case.

FIG. 9 illustrates an embodiment of a multiple reflection suppression means (28a, or 28b), which substitutes the optical circulator (20a) of the embodiment in FIG. 8 with two optical isolators (18a, 18b) and a wavelength selective coupler (24b). The multiple reflection suppression means (28a, or 28b) in this embodiment has two input/output ports (p3, p4) and comprises two optical isolators (18a, 18b) with an input port (g, or g') and an output port (h, or h') respectively, and two wavelength selective couplers (24a, 24b) with an input port (d, or d'), an output port (f, or f'), and an common port (e, or e' respectively.

Looking into the connection mechanism of this embodiment, the common ports (e, e') of the wavelength selective couplers (24a, 24b) are connected to the input/output ports (p3, p4) respectively, the output ports (f, f') of the wavelength selective couplers (24a, 24b) are connected to the input ports (g, g') of the optical isolators (18a, 18b) respectively, and the output ports (h, h') of the optical isolators (18a, 18b) are connected to the input ports (d', d) of the wavelength selective couplers (24b, 24a).

The signal transmission characteristic between the common port (e) and the output port (f) of the first wavelength selective coupler (24a) is the same as that between the common port (e') and the input port (d') of the second wavelength selective coupler (24b), and the signal transmission characteristic between the common port (e) and the input port (d) of the first wavelength selective coupler (24a) is the same as that between the common port (e') and the output port (f') of the second wavelength selective coupler (24b).

Here, the optical isolators (18a, 18b) is a nonreciprocal component that transmit signals in only one direction, from the input port to the output port.

FIG. 10 is illustrates an embodiment of a multiple reflection suppression means (28a, or 28b), which substitutes the wavelength selective coupler (24a) of the embodiment in FIG. 8 with two wavelength selective filter (46a, 46b) with different band-passes from each other and an optical circulator (20). The multiple reflection suppression means (28a, or 28b) in this embodiment has two input/output ports (p3, p4) and comprises two wavelength selective filters (46a, 46b) with an input port (j, or j') and an output port (k, or k') respectively and two optical circulators (20a, 20b) having an input port (a, or a'), an output port (c, or c'), and an common port (b, or b') respectively.

Looking into the connection mechanism of this embodiment, the common ports (b, b') of the optical circulator (20a, 20b) are connected to the input/output ports (p3, p4) respectively, the output ports (c, c') of the optical circulator (20a, 20b) are connected to the input ports (j, j') of the wavelength selective filters (46a, 46b) respectively, and the output ports (k, k') of the wavelength selective filters (46a, 46b) are connected to the input ports (a', a) of the other optical circulators (20b, 20a).

Here, the signal transmission characteristic of the first wavelength selective filter (46a) is the same as the signal transmission characteristic between the input port (d) and the common port (e) of the wavelength selective coupler (24a) described in FIG. 8, and the signal transmission characteristic of the second wavelength selective filter (46b) is the same as the signal transmission characteristic between the common port (e) and the output port (f) of the wavelength selective coupler (24a) described in FIG. 8.

Thus the wavelength selective filters (46a, 46b) are band pass filters that transmit signals within a specific wavelength band and blocks signals with wavelengths out of the band, or comb filters through with repeated pass band and stop band.

As mentioned thereinbefore, the present invention provides a multi-stage bidirectional optical amplifier, have the following advantageous characteristics:

First, it can save the cost because counter-propagating signals share the same mid-stage component:

Second, it can minimize the nonlinear interactions between the counter-propagating signals in the shared mid-stage component because the counter-propagating signals pass through the mid-stage component in opposite direction.

Third, it can minimize the relative intensity noise induced by the reflected light from the mid-stage component and the transmission fiber connected to the amplifier by using multiple reflection suppression means.

Since those having ordinary knowledge and skill in the art of the present invention will recognize additional modifications and applications within the scope thereof, the present invention is not limited to the embodiments and drawings described above.

What is claimed is:

1. A multi-stage bidirectional optical amplifier with two input/output ports (p1, p2) for amplifying counter-propagating upstream and downstream signals, comprising:
    two input/output ports (p1, p2) for amplifying upstream/downstream optical signals proceeding bidirectionally;
    two single-stage bidirectional optical amplifiers (30a, 30b), connected to said input/output ports (p1, p2) respectively, each amplifying the counter-propagating upstream and downstream signals optical signals proceeding bidirectionally at the same time;
    two multiple reflection suppression means (28a, 28b) connected to the single-stage bidirectional optical amplifiers (30a or 30b) respectively, and arranged to transmit optical signals with specific wavelengths only to one direction and to block the signals in the other direction; and
    a mid-stage element component (42), installed between said two multiple reflection suppressing means multiple reflection suppression means (28a, 28b) and between said two single-stage bidirectional optical amplifiers, said mid-stage element comprising a means for chromatic dispersion-compensation, a means for widening optical amplifier gain bandwidth, optical amplifier gain-flattening means, a means for minimizing accumulation of optical amplifier noise, a means for add/drop multiplexing, or a combination of these means.

2. A multi-stage bidirectional optical amplifier as claimed in claim 1, characterized in that said the counter-propagating upstream and downstream signals share a mid-stage component (42).

3. A multi-stage bidirectional optical amplifier as claimed in claim 1 or 2, characterized in that said counter-propagating upstream and downstream signals pass though said mid-stage component (42) in opposite direction.

4. A multi-stage bidirectional optical amplifier as claimed in claim 1,
    wherein said single-stage bidirectional optical amplifiers (30a, 30b) are a set of rare-earth material-doped optical amplifiers, semiconductor optical amplifiers, or fiber Raman optical amplifiers.

5. A multi-stage bidirectional optical amplifier with two input/output ports (p1, p2) for amplifying counter-propagating upstream and downstream signals comprising:
    (1) two single-stage bidirectional optical amplifiers (30a, 30b), connected to said input/output ports (p1, p2) respectively, amplifying counter-propagating upstream and downstream signals at the same time;
    (2) two multiple reflection suppression means (28a, 28b), connected to said single-stage bidirectional optical amplifiers (30a, 30b) respectively, having two input/output ports (p3, p4), comprising:
        an optical circulator (20a) with an input port (a), an output port (c), and a common port (b); and
        a wavelength selective coupler (24a) having an input port (d), an output port (f), and a common port (e), wherein
        the common port (b) of said optical circulator (20a) is connected to the input/output port (p3),
        the output port (c) of said optical circulator (20a) is connected to the input port (d) of said wavelength selective coupler (24a),
        the input port (a) of said optical circulator (20a) is connected to the output port (f) of said wavelength selective coupler (24a), and
        the common port (e) of said wavelength selective coupler (24a) is connected to the input/output port (p4),
    so that the downstream signal entering into said input/output port (p3) passes through the common port (b), the output port (c), the input port (d), the common port (e), and outputs through the input/output port (p4), and
    the upstream signal entering into input/output port (p4) passes through the common port (e), the output port (f), the input port (a), the common port (b), and outputs through the input/output port (p3); and
    (3) a mid-stage component (42), installed between said two multiple reflection suppression means (28a, 28b), comprising a means for chromatic dispersion-compensation, a means for widening optical amplifier gain bandwidth, a means for minimizing the accumulation of the optical amplifier noise, or a combination of these means.

6. A multi-stage bidirectional optical amplifier with two input/output ports (p1, p2) for amplifying counter-propagating upstream and downstream signals comprising:

(1) two single-stage bidirectional optical amplifiers (30a, 30b), connected to said input/output ports (p1, p2) respectively, amplifying counter-propagating upstream and downstream signals at the same time;

(2) two multiple reflection suppression means (28a, 28b), connected to the input/output ports of said single-stage bidirectional optical amplifiers (30a, 30b) respectively, having two input/output ports (p3, p4), comprising:
two optical isolators (18a, 18b) with an input port (g, or g') and an output port (h, or h') respectively; and
two wavelength selective couplers (24a, 24b) having an input port (d, or d'), an output port (f, or f'), and an common port (e, or e') respectively,
wherein
the common ports (e, e') of said wavelength selective couplers (24a, 24b) are connected to the input/output ports (p3, p4) respectively,
the output ports (f, f') of said wavelength selective couplers (24a, 24b) are connected to the input ports (g, g') of said optical isolators (18a, 18b) respectively, and
the output ports (h, h') of said optical isolators (18a, 18b) are connected to the input ports (d', d) of the other wavelength selective couplers (24b, 24a),
so that the downstream signal entering into said input/output port (p3) passes through the common port (e), the output port (f), the input port (g), the output port (h), the input port (d'), the common port (e'), and outputs through the input/output port (p4), and
the upstream signal entering into said input/output port (p4) passes through the common port (e'), the output port (f'), the input port (g'), the output port (h'), the input port (d), the common port (e), and outputs through the input/output port (p3); and (3) a mid-stage component (42), installed between said two multiple reflection suppression means (28a, 28b), comprising a means for chromatic dispersion-compensation, a means for widening optical amplifier gain bandwidth, a means for minimizing the accumulation of the optical amplifier noise, or a combination of these means.

7. A multi-stage bidirectional optical amplifier as claimed in claim 6,
wherein said wavelength selective couplers (24a, 24b) are a set of wavelength division multiplexers that separate and/or couple the downstream and the upstream signals in different wavelength bands.

8. A multi-stage bidirectional optical amplifier as claimed in claim 6,
wherein said wavelength selective couplers (24a, 24b) are a set of wavelength interleavers that separate and/or couple the downstream and the upstream signals of which wavelengths are interleaved with each other.

9. A multi-stage bidirectional optical amplifier with two input/output ports (p1, p2) for amplifying counter-propagating upstream and downstream signals comprising:
(1) two single-stage bidirectional optical amplifiers (30a, 30b), connected to said input/output ports (p1, p2) respectively, amplifying counter-propagating upstream and downstream signals at the same time;

(2) two multiple reflection suppression means (28a, 28b), connected to the input/output ports of said single-stage bidirectional optical amplifiers (30a, 30b) respectively, having two input/output ports (p3, p4), comprising:
two wavelength selective filters (46a, 46b) with an input port (j, or j') and an output port (k, or k') respectively, and
two optical circulators (20a, 20b) with an input port (a, or a'), an output port (c, or c'), and a common port port (b, or b') respectively,
wherein
the common ports (b, b') of said optical circulator (20a, 20b) are connected to the input/output ports (p3, p4) respectively,
the output ports (c, c') of said optical circulator (20a, 20b) are connected to the input ports (j, j') of said wavelength selective filters (46a, 46b) respectively, and
the output ports (k, k') of said wavelength selective filters (46a, 46b) are connected to the input ports (a', a) of the other optical circulators (20b, 20a),
so that the downstream signal entering into said input/output port (p3) passes through the common port (b), the output port (c), the input port (j), the output port (k), the input port (a'), the input/output port (b'), and outputs through the input/output port (p4), and
the upstream signal entering into said input/output port (p4) passes through the common port (b'), the output port (c'), the input port (j'), the output port (k'), the input port (a), the input/output port (b), and outputs through the input/output port (p3); and (3) a mid-stage component (42), installed between said two multiple reflection suppression means (28a, 28b), comprising a means for chromatic dispersion-compensation, a means for widening optical amplifier gain bandwidth, a means for minimizing the accumulation of the optical amplifier noise, or a combination of these means.

10. A multi-stage bidirectional optical amplifier as claimed in claim 9,
wherein said wavelength selective filters (46a, 46b) are a set of band-pass filters that transmit optical signals within a specific wavelength band and blocks optical signals having wavelengths out of the band,
characterized in that the pass-band and the stop-band of a wavelength selective filter (46a) coincide with the stop-band and the pass-band of the other wavelength selective filter (46b) respectively.

11. A multi-stage bidirectional optical amplifier as claimed in claim 9,
wherein said wavelength selective filters (46a, 46b) are a set of comb filters of which pass-band and stop-band repeat with a certain wavelength spacing,
characterized in that the pass-band and the stop-band of a wavelength selective filter (46a) coincide with the stop-band and the pass-band of the other wavelength selective filter (46b) respectively.

* * * * *